United States Patent Office 2,868,679
Patented Jan. 13, 1959

2,868,679

PROCESS AND COMPOSITIONS FOR PRODUCING ALUMINUM SURFACE CONVERSION COATINGS

George H. Pimbley, Inglewood, Calif., assignor to Turco Products, Inc., Los Angeles, Calif., a corporation of California No Drawing. Application December 5, 1955
Serial No. 550,825

28 Claims. (Cl. 148—6.2)

This invention relates to the art of chemically coating aluminum and aluminum alloy surfaces, and particularly to the production of corrosion resistant and paint bonding coatings upon such surfaces. The invention is especially concerned with novel procedure and compositions for producing improved surface conversion coatings on aluminum and its alloys.

In the prior art many methods are known of producing chemical films on aluminum surfaces, some of which have been commercially advantageous and have been widely practiced for many years past. Among these are the formation of artificial oxide coatings by means of electric current in chemical baths, the immersion of clean aluminum surfaces in alkaline baths containing chromate compounds whereby oxide type coatings are produced, and immersion in acidic baths containing an acid which attacks aluminum, together with other components effective to form a fixed integral film upon the surface. It is the latter class to which the present invention belongs. A brief description of this category of chemical coatings on aluminum is given below.

When an object having a surface of aluminum, or of any alloy in which aluminum predominates, is cleaned free of grease and other surface soil, and then immersed in or otherwise contacted with a solution containing anions of an acid which attacks aluminum, such as hydrofluoric acid, together with dichromate and hydrogen ions, a chemical reaction occurs which results in a fixed, integral film upon the aluminum surface. The precise nature of this reaction, and of the resulting film is not known. Probably some of the aluminum is dissolved, bringing about an increase of pH at the interface between the aluminum surface and bath liquid. At some stage in this reaction, the conditions are probably such as to cause reduction of some of the dichromate to trivalent chromium compounds, and formation of aluminum fluorides, oxides and hydroxides. The coating that results is probably a gel-like complex, containing some or all of these substances in an unknown state of chemical combination and physical structure. Generally, these coatings are thin, smooth, non-crystalline, relatively adherent and flexible, moderately lustrous, and of light yellow color with more or less red and greenish iridescence. The exact shade of color and degree of lustre differ greatly, according to which alloy of aluminum is being processed and according to the details of the processing procedure.

Chemical conversion coatings of the kind described, as known in the prior art, have been found sufficiently advantageous to warrant increasing use by airplane manufacturers and other industrial fabricators of aluminum. The procedures for application of such coatings have certain attractive features, including simplicity, low processing temperatures, brief contact time and feasibility of spray application.

However, the coatings and procedures of the prior art possess serious faults, which the present invention seeks to avoid. Among these faults is that of insufficient corrosion resistance to meet present day exacting requirements of military aircraft intended to be flown over salt-laden ocean atmospheres. Another is lack of adherence of the coating immediately after work pieces are lifted from processing tanks, fresh coatings having been subject to streaking and smearing when the coated object is handled shortly after processing. This is inconvenient under heavy shop production schedules, and is a prevalent cause of defective work, rejects, and low production rate. Another drawback of the prior art has been that when the processing has been so adjusted as to temperatures, concentrations, and contact time as to produce deep solid coloring, desirable for ornamentation, the coatings have been lacking in requisite degree of corrosion resistance. Attainment of desirable color has been attended with tendency to early pitting and excessive corrosion under service conditions. Other defects have been, difficulty of process control, erratic performance, early exhaustion of processing baths, and excessive variation of color, general appearance and character of performance between various alloys of aluminum.

The formulations of the prior art have been generally based on the use of an acidic bath containing ions of dichromate and fluorine, and sometimes containing phosphate, arsenate, or trivalent chromium ions. In these formulations, the essential components have been the hydrogen, fluorine, and dichromate ions. In selecting materials for the make-up of the processing baths, attention has been directed mostly toward the nature of the anions to be derived from the ingredients selected. Thus, the dichromate ions are derived from some commonly available commercial product such as sodium or potassium dichromate, or else from the reaction between the acidic components of the bath and an alkali chromate. Alternately, chromic acid might be used as a source of hexavalent chromium. In a similar arbitrary manner, almost every possible source of fluorine ions have been employed or suggested.

Little or nothing has been disclosed by the prior art concerning possible function of cations in the coating reactions. Aside from a few admonitions about substances that would obviously cause waste through undesirable precipitation of essential chemicals, the prior art is mostly silent regarding the nature of cations introduced into the processing solution.

One object of the invention is to increase the resistance of aluminum and aluminum alloy surfaces to corrosion, even under adverse conditions such as exposure to salt laden sea air, chemical fumes and solutions, and the like.

Another object is to provide aluminum and aluminum alloy surfaces with improved resistant coatings which are unusually flexible and adherent under conditions of stress.

A further object is to provide coatings for aluminum and its alloys which are effective to greatly improve the bonding of paints and other organics to the aluminum surfaces.

Yet another object is to provide means of ornamentation or an ornamental coating for aluminum and aluminum alloy surfaces.

A still further object of the invention is to provide unique compositions, and a simple, highly effective process to accomplish the above objects.

Other objects will appear as the description proceeds.

The present invention is based primarily on my discovery that most of the faults and shortcomings of previously known acidic type conversion coatings for aluminum may be remedied, and the corrosion resistance and bonding properties of the coatings greatly improved, by suitable selection of the cations to be introduced along with the essential anions. A subsidiary discovery is that corrosion resistance and bonding properties may be still more enhanced by departure from the prior art in the selection and combination of the anions containing metallo-acid elements.

A marked improvement in the above respects results, I have discovered, by employing cations of the group II elements of the periodic table, and particularly cations of the A family within group II, for example, beryllium, magnesium, calcium, strontium or barium. Also, I have found that the lithium cation provides superior results as compared to the cations of the prior art. These improved results can be obtained when the aforementioned cations of the invention are employed in a system which may or may not also contain sodium or potassium ions. Thus, if desired, sodium or potassium cations may be present in the invention solutions as result of being introduced as a component of source materials for the solution anions to be discussed hereinafter, but the presence of such cations in the solutions hereof does not affect the functioning of said solutions containing cations of the above group II-A elements or lithium, for producing the beneficial results of the invention.

Processing baths containing cations of beryllium, magnesium, calcium, strontium, or barium, according to the invention, produce coatings on aluminum and its alloys that are characterized by being quickly formed, becoming fixed and resistant to smearing almost immediately, and being of rich, uniform color, depending upon the nature of the alloy being processed. In all of these characteristics, and with respect to paint and organic coat bonding, and to corrosion resistance, the coatings produced with baths containing cations of the above metals of group II-A are all much superior to those from prior art baths containing only sodium, potassium or ammonium as cations, and in the absence of the above group II-A cations of the invention. Further, the coatings made with baths containing cations selected from the above group II-A elements are much more uniform from piece to piece, and from one alloy to another than in the prior art. The above improved results are also generally realized employing lithium as cation, but to a degree somewhat less marked than with the aforementioned cations of the invention.

With regard to comparisons between the above noted elements within group II-A, best results are obtained with beryllium as the cation to be used. Magnesium is nearly as good. Calcium is slightly less advantageous than magnesium in brightness of color and corrosion resistance, but is somewhat superior in smear-proofness of fresh coatings. Strontium and barium are approximately equally effective as to corrosion resistance, both being slightly less resistance than calcium. The coating with barium has a peculiar splotchy iridescence, with pronounced greenish tinge. This effect is rather pleasing and of value in certain ornamental applications.

The solutions of the invention preferably also contain at least one anion contaning an element in group VI-A of the periodic table, consisting of hexavalent chromium, molybdenum or tungsten. Accordingly, the term "group VI-A" employed herein is intended to denote the three last mentioned elements. When only one anion containing one of the above metallo-acid elements of group VI-A is employed, the above noted results are enhanced by utilizing as such metallo-acid element, hexavalent chromium. However, solutions within the purview of the invention also include those containing an anion, e. g. including molybdenum or tungsten, in the absence of chromium. When anions containing hexavalent chromium are to be present in the solution, the source material for said chromium may be a material such as chromium trioxide or a chromate or dichromate such as the sodium or potassium chromate or dichromate. Conveniently, both the group II-A element cations and the anions containing hexavalent chromium are furnished together and in the proper proportions to each other by employing a source material containing both the desired group II-A element or lithium, and hexavalent chromium. Examples of such materials are the chromates and dichromates of magnesium, calcium, strontium or barium, or lithium.

I have found that a further very substantial improvement is realized by the incorporation in the processing solution of substances yielding ions containing molybdenum or tungsten, together with substances yielding ions containing hexavalent chromium. Said substances are preferably employed in such proportions that the amount of molybdenum or tungsten will not be less than about one-eight, or more than about one-half of the amount by weight of hexavalent chromium present, based on the equivalent amounts of chromium, molybdenum and tungsten in the solution in their elemental or ionic form. If desired, all three of the metallo-acid elements of group VI-A of the periodic table, namely, chromium, molybdenum, and tungsten, may be employed as components of anions for the conversion coating bath hereof. However, when molybdenum or tungsten is the only metallo-acid element present, i. e. in the absence of chromium, the coatings formed are of a light coloration and have a tendency to smear when fresh. I have made the discovery, surprising in view of the deficiencies noted above, that the inclusion in the formulation of compounds yielding anions containing molybdenum or tungsten, and also including the above noted chromates or dichromates, results in superior smear-proofness of fresh coatings, better corrosion resistance, and richer, deeper color. The improvement applies generally to all the formulations hereof containing cations of beryllium, magnesium, calcium, strontium, barium, or lithium. It is to be noted, however, that formulations according to the invention containing molybdenum or tungsten as the sole metallo-acid element present, are valuable in certain cases, e. g. for producing coatings simulating blued steel. When a proportions substantially less than about one-eight of molybdenum or tungsten to hexavalent chromium is employed, the improved results are diminished in effect and when more than about one-half part by weight of molybdenum or tungsten is utilized per part of hexavalent chromium, there is an increased tendency of the coatings to smear. However, proportions of molybdenum or tungsten to hexavalent chromium can be below or above the proportions noted above, while still obtaining some improved results according to the invention. Best results are obtained employing a proportion of about one-fourth part of molybdenum or tungsten by weight with each part of hexavalent chromium, based on the equivalent amounts of chromium and molybdenum and tungsten in the solution in their elemental or ionic form.

According to the invention, a synergistic effect is produced by the presence in the processing solution of (1) molybdenum and/or tungsten, along with (2) chromium, since results are thus realized which cannot be obtained by either of these two substances acting alone. Coatings from baths containing either molybdenum or tungsten as the only metallo-acid anion have a tendency to smear when fresh, as previously noted, but when molybdenum or tungsten is used jointly with hexavalent chromium, preferably in minor proportion thereto, there is substantially no smearing. On the other hand, coatings from baths having chromium as the only metallo-acid element also have some tendency to smear when fresh; while the addition to such baths of the above noted minor proportion of molybdenum or tungsten eliminates such tendency and also greatly improves color and corrosion resistance. The reason for these characteristics imparted to the film complex by chromium acting jointly with either molybdenum or tungsten are not at present clearly understood by me but have been amply demonstrated by experiment and practice. It is also noted, however, that formulations of compounds containing the group II-A elements, or lithium, in conjunction with hexavalent chromium as the sole metallo-acid element, produce coatings superior to the prior art.

The following table will serve to illustrate three of the effects recited hereinbefore, namely, (1) the improvement of corrosion resistance resulting from use of the above noted group II-A cations and lithium, in combination with hexavalent chromium, over the prior art use of sodium or potassium as the sole cations, in conjunction with hexavalent chromium, (2) the relative corrosion resistance of coatings produced employing the elements of group II-A and lithium, and (3) the improvement experienced when molybdate compound is included, along with hexavalent chromium compounds.

Table 1

| Cation | Estimated Percent Surface Intact After 168 Hours' Salt Spray Exposure | |
|---|---|---|
| | Hexavalent Chromium Without Molybdate | Hexavalent Chromium With Molybdate |
| Sodium | 60 | 88 |
| Potassium | 60 | 90 |
| Beryllium | 85 | 99 |
| Magnesium | 80 | 98 |
| Calcium | 70 | 96 |
| Strotium | 70 | 95 |
| Barium | 70 | 95 |
| Lithium | 75 | 94 |

The data for Table I was derived in the manner below. Two groups of eight processing baths each were prepared, each group representing the eight cation elements shown, one cation in each of the baths. Each of the 16 baths contained 3.95 grams of combined chromium, introduced in the form of dry commercial chromates of the cation elements set forth, except that in the two baths containing beryllium as cation, an aqueous solution was made of beryllium hydroxide and chromium trioxide. Each bath also contained 3.78 grams sodium fluoborate, and sufficient distilled water to make one liter total volume. To each of the baths of the second group was added 1.12 grams sodium molybdate, $Na_2MoO_4$. After mixing these ingredients together, sufficient nitric acid was added to adjust the pH of each bath to 1.9. The baths were allowed to stand for 48 hours, whereupon minor adjustments with nitric acid were made, as needed, to bring each to pH 1.9. Cleaned, deoxidized of 24-S-T3 aluminum were then immersed in the baths for four minutes at 90° F. The panels were rinsed in cold water and allowed to hang with free access of air for 48 hours. They were then placed in a salt spray cabinet for 168 hours exposure to salt spray mist, under usual standard conditions. The corrosion effect on each panel was then expressed as estimated percent of area intact in each case.

The above table shows that the percentage of aluminum surface remaining intact after 168 hours exposure to salt spray varied from 70% for calcium, strontium and barium, to 85% for beryllium, with respect to the group II-A elements and lithium of the invention in solutions containing hexavalent chromium without molybdate, whereas in the same solutions containing only the prior art sodium and/or potassium cations, such percentage was only 60%. In the same solutions containing molybdate along with hexavalent chromium the percentage of surface remaining intact varied from 94% for lithium to 99% for beryllium with respect to the cations of the invention, whereas employing only sodium or potassium as cations in the absence of the cations of the invention, such percentage was 90% or less.

The precise nature of the chemical and physical reactions that occur during the treatment of aluminum surfaces by my solutions and according to my process is not presently known to me; nor is the exact nature of the coatings formed; nor am I aware as to how the cations and anions combined in the manner described above function to produce my marked improvements. However, it has been demonstrated by actual practice that baths so prepared according to the present invention do produce coatings on aluminum and aluminum alloys that are superior to prior art coatings, and it is to be understood that the invention is not to be limited by any theories as to how these results are accomplished.

The aluminum surfaces on which my invention has been successfully applied include substantially pure aluminum and all of its ordinary commercial alloys. Examples of alloys on which the invention has been successfully applied are as follows, the old and new alloy designations being those published in "Materials and Methods," September 1954, page 139. In the same publication the composition of each alloy is set forth. These examples are by way of illustration only, and are not intended to include all the types of aluminum surfaces upon which the invention is useful.

| Old Designation | New Designation |
|---|---|
| 2-S | 1100 |
| 3-S | 3003 |
| 24-S-T | 2024 |
| 52-S | 5052 |
| 53-S | 6053 |
| 61-S | 6061 |
| 75-Clad | 7075 (Clad) |
| 13-X-Die Casting | |

The various aluminum alloys provided with protective coatings in accordance with this invention are useful in the fabrication of airplanes, coach bodies, building structural parts, household utility appliances, and countless other industrial objects, all of which are thereby improved with respect to corrosion resistance, paint bonding, and appearance.

In the practice of my invention, an aqueous solution is first prepared, containing, in suitable proportions, the cations of the above group II-A elements or lithium, and the anions containing metallo-acid elements, selected in accordance with the principles of the present invention, as set out hereinbefore, together with hydrogen ions and suitable proportions of an anion which effectively attacks or corrodes aluminum such as anions containing fluorine, chlorine, bromine, or iodine. The preferred anion for this purpose is the fluorine-containing ion, as this type is the most effective and convenient. The anions containing chlorine, bromine, and iodine are also effective and useful for the attack on the aluminum surface, but in a lesser degree, and by the use of higher processing temperatures and longer period of contact. The color of coatings produced with the aid of these alternate type aluminum attacking anions tends to be less bright and golden than with fluorine-containing ions; more toward brown and gray. In such formulations I have found that deeper and more adherent colorations result when a minor proportion of some compound of zinc, cadmium, or mercury is included in the formulation. The amount of zinc, cadmium or mercury employed may vary, amounts of these elements which may be used, based on the equivalent weights of these elements in their elemental or ionic form being as follows: about 0.2-1.0 gram of Zn per liter of processing bath; about 0.4-1.5 grams per liter of Cd; or about 1.0-2.0 grams per liter of Hg; although these ranges are not critical. The processing solution thus prepared is contacted with the clean aluminum surfaces by usual methods of application, such as spraying, immersion, brushing, swabbing, etc. under suitable conditions of temperature, and length of time of contact, to produce the desired improved surface conversion coating.

It is difficult as a practical matter to define a suitable processing solution in terms of concentrations of each of the ions contained therein, inasmuch as the exact degree of ionization for each compound under all of the varying conditions cannot be precisely ascertained. I have found, however, that especially successful operating solutions result when the proportions of the various ingredients, as introduced, are so adjusted that the preferred fluorine element and the metallo-acid elements, i. e. molybdenum, tungsten and chromium, existing in various states of combination, have ratios to each other that fall within certain ranges, as set forth below. I have found that another feature for providing satisfactory processing solutions according to the invention is that the amount in grams per liter of the respective cations and metallo-acid elements introduced should be within certain ranges of concentration, set forth below, for producing best results.

I have found further that a satisfactory processing solution should most desirably possess a concentration of hydrogen ions such that the pH of the solution falls within the range 1.7–2.1. A pH of about 2.2 is a preferred upper limit at which the coating can be formed, while a pH of about 1.3 is a preferred lower limit for corrosive attack of the aluminum. However, when obtainment of a desired color is the controlling factor, the pH can be even less than 1.3 provided excessive attack on the aluminum does not take place. While nitric acid is preferred, other acidic materials such as $H_2SO_4$, phosphoric acid and acid salts thereof can also be employed provided the particular acidic material utilized does not produce excessive attack on the aluminum nor excessive insoluble material or sludge in the processing solution.

The proportions of suitable cations present in the bath, in relation to the amounts of metallo-acid containing anions, and fluorine-containing ions present, is of minor importance, as long as there is present a substantial proportion of such cations, and as long as the amount is not highly excessive. I have found that the ordinary commercial compounds, magnesium chromate, magnesium dichromate, calcium chromate, calcium dichromate, strontium chromate and dichromate, sodium molybdate, sodium tungstate, and the like, are satisfactory source materials for both the cations and the metallo-acid anions described above, and that they yield highly satisfactory processing solutions when employed along with the source material for the preferred fluorine-containing ions, and with an acid such as nitric, preferably in proportions set forth below as to ratios of metallo-acid element to combined fluorine, and as to concentration of metallo-acid element. In other words, if the ordinary commercial compounds mentioned above are used in proportions such as to give a ratio of metallo-acid element to combined fluorine, and a concentration of metallo-acid element within the ranges set out below, then satisfactory cations of the invention will also be present in adequate amount and proportion. Generally, I have found that the amount of cation employed can be in the range of about .03 to as much as 20 grams per liter of processing solution, depending on the particular cation employed, based on the equivalent amounts of the group II–A elements or lithium present in their elemental or ionic form. Smaller amounts of the lighter cations such as beryllium are generally present as compared to the heavier cations such as strontium and barium.

When hexavalent chromium compounds are employed as the source of anions containing a metallo-acid element, there can be considerable latitude in the range of concentration of such compounds. I have found that a suitable working concentration of hexavalent chromium for purposes of the invention ranges between 1.3 and 4.5 grams per liter of processing solution, based on the equivalent weight of chromium present when in its elemental or ionic form.

Concerning the amounts of source material for fluorine-containing ions preferably used along with the group VI–A, e. g. hexavalent chromium, compound in the bath, the amounts of such material may also be varied to produce the desired results. However, here consideration should be given to the ratio of the amounts of combined fluorine and of combined hexavalent chromium with respect to each other. It is thought that the operation of the process of the invention involves release of fluorine-containing ions, which serve to attack the aluminum surface as a part of the coating action. It is thus necessary to have present enough source material to supply an adequate proportion of such ions. On the other hand, a proportion of fluorine-containing substances greatly in excess of that required for proper coating action will cause excessive attack on the aluminum and impair the anti-corrosion value of the coating. In view of lack of exact knowledge of the chemical reactions that occur in the coating process, the amount of compound containing the aluminum attacking anion, preferably fluorine-containing compound, to be introduced into every type of processing solution that may be successfully used in the practice of this invention cannot be precisely fixed as a practical matter because of the wide variations in conditions thus encountered. However, I have experienced highly satisfactory results with solutions in which the ratio of hexavalent chromium to fluorine has a range between 0.9 and 2.3, based on the equivalent weights of hexavalent chromium and fluorine either in elemental or ionic form in the solution, although it is to be understood that such range is not critical. This range of ratios permits use of a variety of source materials for fluorine-containing ions. I prefer to use sodium fluoborate, $NaBF_4$, as I believe it to be the most consistent and stable in its functioning, without tendency to cause fluctuating pH in the bath. However, many other fluorine compounds can be successfully used, including $NaF$, $NH_4HF_2$, $HBF_4$, $NH_4BF_4$, and $NaSiF_6$. These compounds vary in ionization characteristics, and hence, they are used in varying proportions, depending upon the particular compound selected. I have found that the more simple fluorides, such as $NaF$, should be present in such proportion that the ratio of hexavalent chromium to fluorine approaches the 2.3 end of the above range. The more complex fluorine compounds, such as $NaBF_4$, may be satisfactorily used in larger quantities, so that the ratio of hexavalent chromium to fluorine approaches the 0.9 limit of the above range. When using $NaBF_4$, I prefer that such ratio be approximately 1.5.

When molybdenum or tungsten compounds are employed as the only sources of anions containing metallo-acid elements, the same general considerations prevail as to excess and deficiency of aluminum attacking anion, preferably fluorine, and as to proportions of metallo-acid element to fluorine, as obtain for the formulations in which hexavalent chromium is the only metallo-acid element. The concentrations of metallo-acid element per liter will be different by weight because of varying atomic or combining weights of the three elements, chromium, molybdenum and tungsten. I have found suitable working concentrations for molybdenum and tungsten according to the invention to be in the range of 3 to 10 grams Mo content per liter for molybdenum, and a range of 5 to 16 grams W content per liter for tungsten, based on the equivalent weights of molybdenum and tungsten either in their elemental or ionic form. Concerning the range of ratios Mo:F and W:F, I have found the best working range to be the same as for the ratio of hexavalent chromium to fluorine, that is, between about 0.9 and 2.3, based on the equivalent amounts or weights of molybdenum, tungsten and fluorine present either in elemental or ionic form, although this range of ratios is also not to be considered critical. The ratio should be toward the 2.3 end of the range when simple fluorides such as $NaF$ are used as sources of fluorine-containing anions, and toward the 0.9 end of the range when more complex fluorine compounds are used. I prefer a ratio of about 1.5 for both Mo:F and W:F, when sodium fluoborate is employed as the fluorine compound.

When it is desired to employ aluminum-attacking substances other than those containing fluorine, the same general considerations obtain as to the proportions between such substances and the metallo-acid elements. Thus, when chlorine-containing substances are used, the range of the ratio Cr (VI):Cl may be about the same as for fluorine, i. e. 0.9–2.3. Because of the higher atomic weights of bromine and iodine, and the more sluggish action in processing baths of this invention, as compared with fluorine, it is feasible to use larger amounts of Br and I, so that the value of the ratio Cr (VI) or Mo or W:Br or I will be smaller. Thus, a suitable range for Cr (VI):Br is 0.5–2.0; and a suitable range for Cr (VI):I is 0.2–1.7. It is to be understood, however, that these ranges are not critical and that results nearly as satisfactory may be obtained outside these limits, but they are the ranges I prefer.

When hexavalent chromium compounds, and molybdenum and/or tungsten compounds are combined as sources for more than one metallo-acid element in the formulation, then the various compounds are proportioned according to the varying molecular weights, in accordance with the principles set forth above as to concentrations, ratios, and proportions. Under these conditions the ratio of hexavalent chromium plus molybdenum or tungsten, e. g. to fluorine is preferably in the range between about 0.9 and 2.3, again based on the equivalent weights of these elements or ions in the solution.

Following are examples of practice of my invention.

Example 1

A formulation consisting of the ingredients listed below was prepared.

| | Grams |
|---|---|
| Beryllium hydroxide, Be(OH)$_2$ | 3.27 |
| Chromium trioxide, CrO$_3$ | 7.60 |
| Nitric acid, 40 deg. Bé | 0.84 |
| Sodium fluoborate, NaBF$_4$ | 3.78 |
| Sodium molybdate, Na$_2$MoO$_4$ | 1.12 |

Water to make 1 liter.

A processing bath made with this formulation produces outstandingly superior conversion coatings on surfaces of aluminum and its alloys. As regards corrosion resistance, it was found in the case of four separate tests in a standard salt spray cabinet that panels of 24–S–T3 alloy coated by treatment in the above solution and unpainted withstood an exposure period of 250 hours in two cases and 225 hours in two cases, without signs of corrosion other than a few small isolated pits, whereas standard formulations of the prior art, using only group I–A cations, i. e. sodium or potassium, and anions containing hexavalent chromium as the only metallo-acid element, seldom withstood the salt spray test for more than 168 hours. The above formulation represents a highly successful embodiment of the invention.

Example 2

A formulation consisting of the ingredients listed below was prepared.

| | Grams |
|---|---|
| Magnesium chromate, MgCrO$_4$.5H$_2$O | 17.50 |
| Sodium fluoborate, NaBF$_4$ | 3.78 |
| Sodium molybdate | 1.12 |
| Nitric acid, 40 deg. Bé | 11.00 |

Water to make 1 litre.

This formulation is nearly as effective as the formulation of Example 1, but has the advantage of being cheaper to prepare. The greater part of the anion content is supplied by the chromate portion of the magnesium chromate, the remainder being supplied by the sodium molybdate. Panels of 24–S–T3 aluminum alloy, coated by treatment with this solution and exposed unpainted in a standard salt spray cabinet, generally withstood more than 200 hours test without significant sign of corrosion.

Example 3

A formulation consisting of the ingredients listed below was prepared.

| | Grams |
|---|---|
| Calcium chromate, CaCrO$_4$ | 11.90 |
| Sodium fluoborate, NaBF$_4$ | 3.78 |
| Sodium molybdate, NaMoO$_4$ | 1.12 |
| Nitric acid, 40 deg. Bé | 11.00 |

Water to make 1 litre.

This formulation is very similar to that of Example 2, and is somewhat more economical. The results obtained employing this formulation according to the invention are comparable to those realized employing the formulation of Example 1, and are far superior to conventional prior art formulations made with group 1–A cations and dichromate, e. g. sodium or potassium dichromate.

Example 4

A formulation consisting of the ingredients listed below was prepared.

| | Grams |
|---|---|
| Strontium chromate, SrCrO$_4$ | 15.40 |
| Sodium fluoborate, NaBF$_4$ | 3.78 |
| Sodium molybdate, Na$_2$MoO$_4$ | 1.12 |
| Nitric acid, 40 deg. Bé | 11.00 |

Water to make 1 litre.

This formulation performs in a manner very similar to that of Example 2, although the corrosion resistance is slightly less.

Example 5

A formulation consisting of the ingredients listed below was prepared.

| | Grams |
|---|---|
| Barium chromate, BaCrO$_4$ | 19.20 |
| Sodium fluoborate, NaBF$_4$ | 3.78 |
| Nitric acid, 40 deg. Bé | 11.00 |

Water to make 1 litre.

This formulation was unusual in several respects. Typical deep dichromate color did not appear in the bath, probably because of limited formation of dichromate due to limited solubility of barium chromate. Nevertheless, enough ions of each of the required kinds were present continuously to be effective in the processing. The appearance of coatings made with this formulation were unique, there being a peculiar, splotchy iridescence with a pronounced greenish hue, which was variegated and pleasing. For this reason the above formulation is advantageous for decorative use on aluminum objects to be left unpainted, or on objects to which clear lacquer top coats are to be applied. Some insoluble material was present in the bath.

Example 6

A formulation consisting of the ingredients listed below was prepared.

| | Grams |
|---|---|
| Barium hydroxide, Ba(OH)$_2$.8H$_2$O | 23.90 |
| Chromium trioxide, CrO$_3$ | 7.60 |
| Sodium fluoborate, NaBF$_4$ | 3.78 |
| Sodium molybdate, Na$_2$MoO$_4$ | 1.12 |
| Nitric acid, 40 deg. Bé | 6.00 |

Water to make 1 litre.

Employing this formulation the characteristic peculiar splotchy, greenish iridescence that appeared when barium was used as a cation was present, but was not as pronounced as with the formulation of Example 5. Corrosion resistance produced was substantially the same as that produced using the Example 4 formulation. As in the case of Example 5, some insoluble material was present in the bath.

Example 7

A formulation consisting of the ingredients listed below was prepared.

| | Grams |
|---|---|
| Magnesium dichromate, $MgCr_2O_7 \cdot 5H_2O$ | 12.50 |
| Sodium fluoborate, $NaBF_4$ | 3.78 |
| Sodium molybdate, $Na_2MoO_4$ | 1.12 |
| Water to make 1 litre. | |

This formulation yielded a processing bath similar in composition to the bath yielded by the Example 2, and the performance was substantially the same. This formulation has the advantage of needing little or no nitric acid to adjust the bath to the most desirable operating range of pH 1.7–2.1.

Example 8

A formulation consisting of the ingredients listed below was prepared.

| | Grams |
|---|---|
| Tungstic acid, $H_2WO_4$ | 19.00 |
| Calcium carbonate, $CaCO_3$ | 7.67 |
| Sodium fluoborate, $NaBF_4$ | 3.80 |
| Nitric acid, 40 deg. Bé | 12.00 |
| Water to make 1 litre. | |

Coatings produced with this formulation were light yellow in color, and had fair adherence and fair corrosion resistance. This bath contained some insoluble matter.

Example 9

A formulation consisting of the following ingredients was prepared.

| | Grams |
|---|---|
| Lithium hydroxide, $LiOH \cdot H_2O$ | 6.4 |
| Molybdenum trioxide, $MoO_3$ | 11.0 |
| Sodium fluoborate, $NaBF_4$ | 3.8 |
| Nitric acid, 40 deg. Bé | 9.0 |
| Water to make 1 litre. | |

Processing baths made with this formation produced coatings on aluminum that were nearly colorless, with a pleasing blue tinge. Adherence and corrosion resistance of such coating were acceptable.

Example 10

A formulation was prepared consisting of the ingredients listed below:

| | Grams |
|---|---|
| Molybdenum trioxide, $MoO_3$ | 10.94 |
| Calcium carbonate, $CaCO_3$ | 7.50 |
| Sodium fluorborate, $NaBF_4$ | 3.78 |
| Nitric acid, 40 deg. Bé | 11.00 |
| Water to make one litre. | |

Coatings produced on aluminum and aluminum alloy objects with this formulation were yellow in color and had satisfactory adherence and corrosion characteristics.

Example 11

A formulation consisting of the ingredients listed below was prepared.

| | Grams |
|---|---|
| Lithium chromate, $Li_2CrO_4 \cdot 2H_2O$ | 12.6 |
| Sodium fluoborate, $NaBF_4$ | 3.78 |
| Sodium molybdate, $Na_2MoO_4$ | 1.12 |
| Nitric acid, 40 deg. Bé | 11.00 |
| Water to make one litre. | |

Coatings produced on aluminum and aluminum alloy objects with this formulation were superior in corrosion resistance to prior art coatings produced by employing sodium and potassium chromate formulations, and were about equal in this respect to the strontium and barium chromate-containing formulations of Examples 4 and 6.

Example 12

A formulation consisting of the ingredients listed below was prepared:

| | Grams |
|---|---|
| Calcium chloride, $CaCl_2$ | 4.3 |
| Potassium dichromate $K_2Cr_2O_7$ | 11.2 |
| Sodium molybdate, $Na_2MoO_4$ | 1.5 |
| Hydrochloric acid, sp. grav. 1.19 | 4.0 |
| Water to make 1 litre. | |

24ST-3 aluminum surfaces were contacted with the bath for five minutes at temperature of 150° F. Coatings produced with this formulation were of extremely light yellow color and very thin, so that it could be called an iridescence rather than a color. Adherence of coating was good and corrosion resistance was fair.

Example 13

A formulation consisting of the ingredients listed below was prepared:

| | Grams |
|---|---|
| Sodium molybdate, $Na_2MoO_4$ | 13.3 |
| Calcium chloride, $CaCl_2$ | 6.6 |
| Zinc chloride, $ZnCl_2$ | 2.0 |
| Hydrochloric acid, spec. grav. 1.19 | 5.1 |
| Water to make 1 litre. | |

24ST-3 aluminum surfaces were immersed in the bath for five minutes at 150° F. Coatings produced were of uniform light gray color, pleasing in appearance, and of satisfactory adherence.

Example 14

A formulation consisting of the ingredients listed below was prepared:

| | Grams |
|---|---|
| Calcium dichromate $CaCr_2O_7 \cdot 4H_2O$ | 12.2 |
| Mercuric bromide, $HgBr_2$ | 3.0 |
| Hydrochloric acid, spec. grav. 1.19 | 7.2 |
| Water to make 1 litre. | |

24ST-3 aluminum surfaces were immersed in the bath for five minutes at 150° F. A heavy yellowish brown coating resulted, of good adherence.

Example 15

A formulation consisting of the ingredients listed below was prepared:

| | Grams |
|---|---|
| Potassium dichromate, $K_2Cr_2O_7$ | 8.0 |
| Calcium chloride, $CaCl_2$ | 3.0 |
| Mercuric chloride, $HgCl_2$ | 3.0 |
| Periodic acid, $HIO_4 \cdot 2H_2O$ | 8.0 |
| Water to make 1 litre. | |

24ST-3 aluminum surfaces were immersed in the bath for five minutes at 150° F. Medium to dark gray coatings were produced, of good adherence and uniformity.

Example 16

A formulation consisting of the ingredients listed below was prepared:

| | Grams |
|---|---|
| Tungstic acid, $H_2WO_4$ | 8.0 |
| Barium chloride, $BaCl_2$ | 4.0 |
| Hydrochloric acid, spec. grav. 1.19 | 12.0 |
| Water to make 1 litre. | |

24ST-3 aluminum surfaces were immersed in the bath for fifteen minutes at 160° F. The bath had considerable insoluble substance. Coatings produced were of a very light gray color, with purple iridescence. Adherence was good.

Example 17

A formulation consisting of the ingredients listed below was prepared:

| | Grams |
|---|---|
| Calcium dichromate $CaCr_2O_7.4H_2O$ | 12.0 |
| Sodium fluoride, NaF | 4.5 |
| Sodium molybdate, $Na_2MoO_4$ | 1.8 |
| Nitric acid, 40 degree Bé | 7.0 |
| Water to make 1 litre. | |

This formulation yields a processing bath similar to that of Example No. 3, the difference being use of calcium dichromate instead of the chromate, and sodium fluoride instead of the fluoborate. Results obtained were comparable to those realized with the No. 3 formulation.

Example 18

A formulation consisting of the ingredients listed below was prepared:

| | Grams |
|---|---|
| Calcium dichromate, $CaCr_2O_7$ | 11.5 |
| Sodium molybdate, $Na_2MoO_4$ | 1.5 |
| Hydrofluoric acid, 48% HF aqueous soln | 4.0 |
| Phosphoric acid, 75% grade | 3.0 |
| Water to make 1 litre. | |

This formulation is similar to that of the previous example, the principal difference being the employment of aqueous solution of HF instead of NaF. Results were comparable.

Example 19

The procedure of Example 1 is followed except that the amount of sodium fluoborate employed is changed to 3.15 grams per litre, with similar results to those of Example 1 obtainable.

Example 20

The procedure of Example 2 is carried out except that the amounts of sodium fluoborate and sodium molybdate employed are changed to 3.5 grams and 1.25 grams respectively, per litre, with results similar to those of Example 2 obtainable.

Example 21

The procedure of Example 5 is carried out except that the amounts of sodium fluorborate and nitric acid employed are changed to 2.52 grams of 9.00 grams, respectively, per litre, with results similar to those of Example 5 obtainable.

The chemicals for make-up of the bath may be introduced in any convenient form such as powders or liquid solutions; separately, or as compounded products. Usually it is most convenient to employ the dry materials as a compounded, powder product, and to introduce the nitric acid, or other liquids separately. Hence, the above described novel solid compositions, as well as the solutions prepared therewith, are features of this invention. A stainless steel vessel should be used for the bath, or some equally resistant vessel that will neither be attacked by the bath, nor have any contaminating effect on the bath. The ingredients for the bath are first mixed cold and the pH of the solution is then ascertained. If outside of the best operating range of 1.7–2.1, the pH can be brought within that range by additions of a suitable acid such as nitric, if the pH is too high, or by a suitable alkaline substance such as ammonium hydroxide if the pH is too low. Ordinarily, as in the case of known prior art solutions of this general nature for conversion coating of aluminum, results employing the solutions hereof are not satisfactory with a freshly made bath. After the bath is made up as above described, it should stand overnight and again be adjusted to the desired pH before use.

In those cases where the processing tank is equipped with suitable heating apparatus, a more rapid and satisfactory method of "breaking in" the solution is available. The temperature of the fresh bath is raised to 160° F. and held there for five minutes. Then the heat is turned off and the bath is allowed to cool down to the preferred operating temperature range of 75°–95° F. It is then ready for use.

The aluminum surfaces to be treated in the solutions of the invention should be free from grease and other surface soils. A mild alkaline cleaning bath, e. g. one containing alkali metal carbonates, safe for aluminum, at a concentration of 6 to 8 oz. per gallon, is recommended for this purpose, at 170°–180° F.

End results will be improved if surface oxide coating is removed, after alkaline cleaning, by pretreatment in a suitable acid type deoxidizing agent, e. g. mixtures of sulfuric, chromic and hydrofluoric acids. The work should be thoroughly rinsed after each pre-cleaning and deoxidizing operation prior to treatment in the solution of the invention.

The clean aluminum surfaces may be treated by dipping the objects into the processing solutions hereof. Operating temperature ranges of 75°–95° F. and immersion time of 3–5 minutes are recommended. These conditions should be regulated according to the nature of the coating being produced. Thin, bright, uniform, slightly iridescent coatings of a greenish-golden color, are best for corrosion resistance and paint adhesion. If the coating is dull, powdery or chalky, then the temperature or contact time, or both, should be diminished.

After its removal from the conversion coating bath, the work is rinsed in water. The coating will be of stronger color if the work is allowed to remain suspended in the air for 30 to 60 seconds before rinsing.

The final step is the dry-off, which may be accomplished by the usual methods, e. g. treatment of the coated objects in a dry-off oven.

The above recommendations pertain to dipping application. However, the same baths prepared as above, may also be used for spraying, with the same kind of surface preparation of the aluminum object. For spraying, the solution temperature should be 90°–100° F., and the time of spray contact should be about 1–2 minutes. The same bath may also be used for brushing and swabbing applications. If desired, it may be thickened for this type of application by means of Bentonite clay, so that the solution will not run off vertical surfaces.

The pH of the bath should preferably be maintained at all times during operation within the range 1.7–2.1 by addition of acid when pH is high and by addition of, for example, ammonium hydroxide, when the pH is low. Ordinarily the pH will require adjustment seldom, if ever, after operation is started, except at times of addition of replenishment chemicals.

As a means of routine control, a sample of the bath is withdrawn from time-to-time during operation, and the hexavalent chromium content ascertained, expressed as grams per litre, by usual methods of analysis. It will be found that the Cr(VI) content diminishes as the operation proceeds on a long succession of work pieces, and this periodical determination of Cr(VI) content serves as a convenient criterion as to need for replenishment of the bath. I have found that the various substances in the processing baths used in practice of this invention are ordinarily consumed in about equal proportions. Therefore, a replenishment that will restore he hexavalent chromium to its original content, serves as a criterion as to the amount of replenishment required for the other constituents of the bath. The depleted Cr(VI) is simply restored and then other materials are added in corresponding amounts to replenish these other components. This procedure is most convenient if the dry chemicals have all been added as one mixed product, since an addition of the mixed product sufficient to restore the depleted Cr(VI) will automatically replenish all other constituents in corresponding degree. Acid should be added also, if required, so as to maintain the pH within the above noted range.

I have found that baths operated in accordance with this invention are free from objectionable deposits of solid sludge on the work, or on bottom of the tanks. The operation proceeds smoothly, with little or no waste of chemicals, throughout application to a large number of work pieces in succession.

The term "consisting essentially of" as used in the definition of the ingredients present in the compositions claimed is intended to exclude the presence of other materials in such amounts as to interfere substantially with the properties and characteristics possessed by the compositions set forth but to permit the presence of other materials in such amounts as not substantially to affect said properties and characteristics adversely.

While I have described certain embodiments of my invention for the purpose of illustration, it should be understood that various modifications and adaptations thereof may be made within the spirit of the invention as set forth in the appended claims.

I claim:

1. A process for applying a coating to surfaces of objects of aluminum and its alloys, which comprises treating said objects in an aqueous acidic bath consisting essentially of effective amounts of a cation of the group consisting of beryllium, magnesium, calcium, strontium and barium, and an anion which attacks aluminum, said anion containing a halogen, the pH of said bath being in the range of about 1.3 to about 2.2.

2. A process for applying a coating to surfaces of objects of aluminum and its alloys, which comprises treating said objects in an aqueous acidic bath consisting essentially of effective amounts of a cation of the group consisting of beryllium, magnesium, calcium, strontium and barium, and a fluorine-containing anion, the pH of said bath being in the range of about 1.3 to about 2.2.

3. A process for applying a coating to surfaces of objects of aluminum and its alloys, which comprises treating said objects in an aqueous acidic bath consisting essentially of effective amounts of lithium as a cation, and an anion which attacks aluminum, said anion containing a halogen, the pH of said bath being in the range of about 1.3 to about 2.2.

4. A process for applying a coating to surfaces of objects of aluminum and its alloys, which comprises treating said objects in an aqueous acidic bath comprising as essential active ingredients beryllium as a cation in the range from about .03 to 20 grams per liter of bath, an anion containing an element in group VI–A of the periodic table, and a fluorine-containing anion.

5. A process for applying a coating to surfaces of objects of aluminum and its alloys, which comprises treating said objects in an aqueous acidic bath comprising as essential active ingredients magnesium as a cation in the range from about .03 to 20 grams per liter of bath, an anion containing an element in group VI–A of the periodic table, and a fluorine-containing anion.

6. A process for applying a coating to surfaces of objects of aluminum and its alloys, which comprises treating said objects in an aqueous acidic bath comprising as essential active ingredients calcium as a cation in the range from about .03 to 20 grams per liter of bath, an anion containing an element in group VI–A of the periodic table, and a fluorine-containing anion.

7. A process for applying a coating to surfaces of objects of aluminum and its alloys, which comprises treating said objects in an aqueous acidic bath comprising as essential active ingredients a cation of the group consisting of beryllium, magnesium, calcium, strontium and barium, in the range from about .03 to 20 grams per liter of bath, an anion containing hexavalent chromium, and a fluorine-containing anion.

8. A process for applying a coating to surfaces of objects of aluminum and its alloys, which comprises treating said objects in an aqueous acidic bath comprising as essential active ingredients a cation of the group consisting of beryllium, magnesium, calcium, strontium and barium, in the range from about .03 to 20 grams per liter of bath, an anion containing hexavalent chromium in an amount between about 1.3 and 4.5 grams per liter of bath, an anion containing an element of the group consisting of molybdenum and tungsten, and a fluorine-containing anion.

9. A process for applying a coating to surfaces of objects of aluminum and its alloys, which comprises treating said objects in an aqueous acidic bath comprising a cation of the group consisting of beryllium, magnesium, calcium, strontium and barium, an anion containing hexavalent chromium, an anion containing an element of the group consisting of molybdenum and tungsten, and a fluorine-containing anion, the pH of said bath being in the range of about 1.3 to about 2.2, the amount of hexavalent chromium present being between 1.3 and 4.5 grams per liter of bath, the amount of said element employed being between one-eighth and one-half of the amount by weight of hexavalent chromium present, the ratio of hexavalent chromium plus said element to fluorine being in the range between about 0.9 and 2.3.

10. An aqueous acid bath for applying a coating to surfaces of objects of aluminum and its alloys, which comprises as essential active ingredients effective amounts of a cation of the group consisting of beryllium, magnesium, calcium, strontium and barium, an anion containing an element in group VI–A of the periodic table, and a fluorine-containing anion.

11. An aqueous acid bath for applying a coating to surfaces of objects of aluminum and its alloys, which comprises as essential active ingredients effective amounts of lithium as a cation, an anion containing an element in group VI–A of the periodic table, and a fluorine-containing anion.

12. An aqueous acid bath for applying a coating to surfaces of objects of aluminum and its alloys, which comprises as essential active ingredients calcium as a cation in the range from about .03 to 20 grams per liter of bath, an anion containing hexavalent chromium, a molybdenum-containing anion and a fluorine-containing anion, the pH of said bath being in the range of about 1.3 to about 2.2.

13. An aqueous acid bath for applying a coating to surfaces of objects of aluminum and its alloys, which comprises a cation of the group consisting of beryllium, magnesium, calcium, strontium and barium, an anion containing hexavalent chromium, an anion containing an element of the group consisting of molybdenum and tungsten, a fluorine-containing anion, and nitric acid, the pH of said bath being in the range of 1.7 to 2.1, the amount of said cation present being in the range from about .03 to 20 grams per liter of bath, the amount of hexavalent chromium present being between 1.3 and 4.5 grams per liter of bath, the amount of said element employed being between one-eighth and one-half of the amount by weight of hexavalent chromium present, the ratio of hexavalent chromium plus said element to fluorine being in the range between about 0.9 and 2.3.

14. An aqueous acid bath for applying a coating to surfaces of objects of aluminum and its alloys, which comprises calcium as a cation in the range from about .03 to 20 grams per liter of bath, an anion containing hexavalent chromium, a molybdenum-containing anion, a fluorine-containing anion, and nitric acid, the pH of said bath being in the range of 1.7 to 2.1, the amount of hexavalent chromium present being between 1.3 and 4.5 grams per liter of bath, the amount of molybdenum employed being between one-eighth and one-half of the amount by weight of hexavalent chromium present, the ratio of hexavalent chromium plus molybdenum to fluorine being in the range between about 0.9 and 2.3.

15. A solid composition of matter for preparation of baths for coating objects of aluminum and its alloys, which comprises a mixture of compounds including in chemically combined form a first element of the group consisting of beryllium, magnesium, calcium, strontium and barium, a second element in group VI-A of the periodic table, and fluorine, said composition when added to water forming an ion containing said first element, an ion containing said second element and an ion containing fluorine, in an amount in the range from .03 to 20 grams per liter of said first element, and a ratio of said second element to fluorine in the range between 0.9 and 2.3

16. A solid composition of matter for preparation of baths for coating objects of aluminum and its alloys, which comprises a mixture of compounds including in chemically combined form lithium, an element in group VI-A of the periodic table, and fluorine, said composition when added to water forming an ion containing said element, an ion containing lithium and an ion containing fluorine, in an amount in the range from .03 to 20 grams per liter of lithium and a ratio of said element to fluorine in the range between 0.9 and 2.3.

17. A solid composition of matter for preparation of baths for coating objects of aluminum and its alloys, which comprises a mixture of compounds including in chemically combined form a first element of the group consisting of beryllium, magnesium, calcium, strontium and barium, a second element of the class consisting of molybdenum and tungsten, and hexavalent chromium and fluorine, said composition when added to water forming an ion containing said first element, an ion containing said second element, an ion containing said chromium, and an ion containing fluorine in an amount in the range from .03 to 20 grams per liter of said first element, and a ratio of said second element plus hexavalent chromium to fluorine in the range between 0.93 and 2.3.

18. A solid composition of matter adapted to be dissolved in water to form an aqueous bath effective for applying a coating to surfaces of objects of aluminum and its alloys, consisting essentially of effective amounts of beryllium hydroxide, chromium trioxide, an alkali metal fluoborate and an alkali metal molybdate.

19. A solid composition of matter adapted to be dissolved in water to form an aqueous bath effective for applying a coating to surfaces of objects of aluminum and its alloys, consisting essentially of effective amounts of a magnesium compound containing hexavalent chromium, an alkali metal fluoborate, and an alkali metal molybdate.

20. A solid composition of matter adapted to be dissolved in water to form an aqueous bath effective for applying a coating to surfaces of objects of aluminum and its alloys, consisting essentially of effective amounts of a calcium compound containing hexavalent chromium, an alkali metal fluoborate and an alkali metal molybdate.

21. A process for applying a coating to surfaces of objects of aluminum and its alloys, which comprises treating said objects in an aqueous acidic bath comprising a cation of the group consisting as essential active ingredients of beryllium, magnesium, calcium, strontium and barium, said cation being present in the range from about .03 to 20 grams per liter of bath, and fluoborate anion.

22. A process for applying a coating to surfaces of objects of aluminum and its alloys, which comprises treating said objects in an aqueous acidic bath comprising as essential active ingredients a cation of the group consisting of beryllium, magnesium, calcium, strontium and barium, said cation being present in the range from about .03 to 20 grams per liter of bath, an anion containing hexavalent chromium in an amount between about 1.3 and 4.5 grams per liter of bath, the molybdate anion and the fluoborate anion.

23. An aqueous acid bath for applying a coating to surfaces of objects of aluminum and its alloys, which comprises as essential active ingredients a cation of the group consisting of beryllium, magnesium, calcium, strontium and barium, said cation being present in the range from about .03 to 20 grams per liter of bath, an anion containing an element in group VI-A of the periodic table, and the fluoborate anion.

24. An aqueous acid bath for applying a coating to surfaces of objects of aluminum and its alloys, which comprises as essential active ingredients calcium as a cation in the range from about .03 to 20 grams per liter of bath, an anion containing hexavalent chromium in an amount between about 1.3 and 4.5 grams per liter of bath, the molybdate anion, the fluoborate anion and nitric acid.

25. A solid composition of matter for preparation of baths for coating objects of aluminum and its alloys, which comprises a mixture of compounds including in chemically combined form a first element of the group consisting of beryllium, magnesium, calcium, strontium and barium, and hexavalent chromium, said composition when added to water forming an ion containing said first element and an ion containing hexavalent chromium, in an amount in the range from .03 to 20 grams per liter of said first element and 1.3 to 4.5 grams per liter of hexavalent chromium.

26. A solid composition of matter for preparation of baths for coating objects of aluminum and its alloys, which comprises a mixture of compounds including in chemically combined form a first element of the group consisting of beryllium, magnesium, calcium, strontium and barium, and molybdenum, said composition when added to water forming an ion containing said first element and an ion containing molybdenum, in an amount in the range from .03 to 20 grams per liter of said first element and 3 to 10 grams per liter of molybdenum.

27. A solid composition of matter for preparation of baths for coating objects of aluminum and its alloys, which comprises a mixture of compounds including in chemically combined form a first element of the group consisting of beryllium, magnesium, calcium, strontium and barium, and tungsten, said composition when added to water forming an ion containing said first element and an ion containing tungsten, in an amount in the range from .03 to 20 grams per liter of said first element and 5 to 16 grams per liter of tungsten.

28. An aqueous acid bath for applying a coating to surfaces of objects of aluminum and its alloys, which comprises as essential active ingredients effective amounts of a cation of the group consisting of beryllium, magnesium, calcium, strontium and barium, an anion containing an element in group VI-A of the periodic table, and a halogen-containing anion, the pH of said bath being in the range of about 1.3 to about 2.2.

References Cited in the file of this patent

UNITED STATES PATENTS

| | | |
|---|---|---|
| 1,723,067 | Pacz | Aug. 6, 1929 |
| 1,923,502 | Prier | Aug. 22, 1933 |
| 2,418,608 | Thompson et al. | Apr. 8, 1947 |
| 2,438,877 | Spruance | Mar. 30, 1948 |
| 2,494,910 | Spruance | Jan. 17, 1950 |
| 2,550,328 | Cohn | Apr. 24, 1951 |
| 2,554,256 | Lewis et al. | May 22, 1951 |
| 2,655,439 | Florersch | Oct. 13, 1953 |
| 2,678,291 | Spruance | May 11, 1954 |

FOREIGN PATENTS

| | | |
|---|---|---|
| 166,135 | Australia | Nov. 28, 1955 |